2,817,636

PERMANENT TYPE ANTIFREEZE COMPOSITION

Robert C. Barker, Pittsburgh, Pa., assignor to Gulf Research & Development Company, Pittsburgh, Pa., a corporation of Delaware No Drawing. Application October 4, 1954
Serial No. 460,254

5 Claims. (Cl. 252—75)

The invention described herein relates to an improved permanent type antifreeze composition particularly for utilization in cooling systems of internal combustion engines.

Permanent antifreeze compositions such as ethylene glycol have, of course, been known and used for years. However, such antifreeze compositions have not been entirely satisfactory. These compositions are used in an environment where they are in contact with several different metals such as copper, iron, solder, etc. Electrolytic effects cause gradual destruction of the structure composed of these metals. These dihydric alcohols are especially destructive of iron components of a cooling system. Also the antifreeze composition is exposed to the action of elevated temperatures and a certain amount of air or oxygen. Oxidation of the antifreeze composition into corrosive materials therefore takes place during use. Corrosion of containers constructed of iron or tin plate and having soldered seams also takes place during storage of these antifreeze agents. Various corrosion inhibitors or the like have been added to the antifreeze agents to avoid this problem, but have not eliminated corrosion to a satisfactory extent. Furthermore, many of these additives cause bearing seizure when the antifreeze accidentally becomes mixed with the crankcase oil.

This invention has for its object to overcome the above-described difficulties. Another object is to provide a permanent antifreeze composition having markedly reduced corrosive action during storage or use. A still further object is to provide a permanent type antifreeze composition which has improved characteristics in that corrosion of internal combustion engine cooling equipment is markedly reduced. Another object is to provide a permanent type antifreeze composition which will not cause bearing seizure. Other objects will appear hereinafter.

These and other objects are accomplished in accordance with my invention which comprises a dihydric aliphatic alcohol of low molecular weight as an antifreeze agent which contains an alkali metal nitrite, triethanolamine, an alkali metal salt of 2-ethylhexyl-3-methylbutyl-orthophosphoric acid and an alkali metal mercaptobenzothiazol. It has been found in accordance with my invention that this composition has improved properties when utilized as an antifreeze composition.

In the following description I have set forth several of the preferred embodiments of my invention, but it is to be understood that they are given by way of illustration and not in limitation thereof.

The antifreeze agent contemplated by my invention is preferably ethylene glycol, and I will describe my invention in detail in connection therewith. However, the invention is equally applicable to other low molecular weight dihydroxy aliphatic alcohols such as propylene glycol or mixtures such as 75 percent ethylene glycol, 20 percent propylene glycol and 5 percent polyethylene glycol; 80 percent ethylene glycol, 15 percent propylene glycol and 5 percent polyethylene glycol; 90 percent ethylene glycol and 10 percent diethylene glycol; or 95 percent ethylene glycol and 5 percent diethylene glycol.

The four additives to be incorporated in the antifreeze agent in accordance with my invention can be dissolved in a small amount of the permanent type antifreeze agent, and this solution then may be added to the antifreeze agent in the desired amounts, preferably with stirring to effect complete intermixture and solution thereof. It is also satisfactory to first dissolve the additives in a small amount of water and the solution thus formed may be incorporated in the larger bulk of the antifreeze agent. Commercial considerations necessitate that the antifreeze composition as marketed should contain as little diluent as possible. Therefore, when utilizing an inactive material such as water to assist in preparing the composition, as little water as possible should be employed. If desired, the additives may be directly incorporated in the bulk of the antifreeze agent. It will be apparent to a chemist that other methods or combinations of the foregoing methods may be used to obtain solution of the additives in the antifreeze agent.

The alkali metal nitrite is incorporated in the dihydroxy antifreeze agent in an amount such that the antifreeze composition will contain between about 0.20 and 0.80 percent by weight of alkali metal nitrite. It is preferred that the antifreeze composition contain approximately 0.5 percent alkali metal nitrite. The triethanolamine is incorporated so that the antifreeze composition contains between about 0.20 and 1.00 percent. It is preferred that the composition contain approximately 0.5 percent triethanolamine. The alkali metal 2-ethylhexyl-3-methylbutylorthophosphate is incorporated so that the antifreeze composition contains between about 0.10 and 0.50 percent of alkali metal 2-ethylhexyl-3-methylbutylorthophosphate. It is preferred that the antifreeze composition contain approximately .25 percent of alkali metal 2-ethylhexyl-3-methylbutylorthophosphate. The antifreeze composition is prepared so that it contains between about .05 and 0.15 percent alkali metal mercaptobenzothiazol. It is preferred that the antifreeze composition contain approximately 0.10 percent of alkali metal mercaptobenzothiazol. It is not necessary that the above percentage ranges be observed to obtain improved results, i. e. smaller or larger amounts can be used. However, for best results these ranges should be used. While I prefer to utilize the sodium salts of the nitrite, mercaptobenzothiazol and 2-ethylhexyl-3-methylbutylorthophosphoric acid, other alkali metal salts such as potassium may be employed.

The antifreeze compositions constituting my invention may be utilized in a number of different fields. For instance they may be added to liquids utilized in air conditioning systems to transfer heat wherein temperatures below the freezing point of water are encountered. However, the primary field of application is in connection with the cooling systems for internal combustion engines. In such cooling systems the antifreeze agent constituting my invention is usually diluted with water to obtain a 10–60 percent by volume solution.

I have conducted laboratory tests to evaluate the antifreeze compositions constituting my invention. Test solutions were prepared by dissolving the inhibiting agent or agents to be tested in ethylene glycol and adding this ethylene glycol to water to form a 20 percent ethylene glycol solution. Test metal couplings were then immersed in the test solution so that a solution to metal surface ratio of about 8 cc. of solution per square inch of metal surface was present. Air was then bubbled through the solution for a period of 336 hours, the solution being heated to 160° F. At the end of this period, the metal couples under test were inspected and were weighed for loss of metal. The metal couples used in the test were 1⅜" x 1" x ⅛" strips of clean electrolytic copper and SAE 1020 steel joined together with solder in such a manner as to give a ⅝" x 1" ⅛" solder block at each end of the couples. The resulting copper-steel-solder couples measured 2" x 1" x ¼". The tests also included determination of the pH before and after the test and the reserve alkalinity before and after the test. A pH in the acid range is unsatisfactory. Retention of reserve alkalinity is desirable since corrosion is accelerated when reserve alkalinity has been depleted in the solution. The results of these tests are given in Table I.

TABLE I

*Corrosion test results for steel-solder-copper couples in 20% ethylene glycol solutions*

| Test | Inhibitor | Percent by Weight | Corrosion Loss, mg./sq. in./336 hr. | pH Before Test | pH After Test | Reserve Before Test | Alkalinity After Test | Comments |
|---|---|---|---|---|---|---|---|---|
|  | None | | 140.4 | 7.48 | 5.02 | | | Steel was badly corroded. |
| #1 | (a) sodium nitrite | 0.50 | 42.3 | 7.50 | [1] 9.61 | 0.1 | [1] 2.8 | Steel was corroded. |
| #2 | (b) sodium 2-ethylhexyl-3-methylbutylorthophosphate. | 0.25 | 22.9 | 7.43 | 6.72 | 0.5 | 0.3 | Steel was corroded. Solder was etched. |
| #3 | (c) triethanolamine | 0.50 | 41.7 | 9.03 | 7.17 | 3.9 | 0.7 | Steel was badly corroded. |
| #4 | (d) sodium mercaptobenzothiazol. | 0.10 | 193.0 | 8.02 | 4.40 | 0.5 | 0.0 | Do. |
| #5 | (a)<br>(b) | 0.50<br>0.25 | 2.6 | 8.00 | 8.00 | 1.3 | 0.3 | Solder was etched. Low reserve alkalinity. |
| #6 | (a)<br>(c) | 0.50<br>0.50 | 4.0 | 8.98 | 8.42 | 4.5 | 3.1 | Solder was etched. |
| #7 | (a)<br>(d) | 0.50<br>0.10 | 33.2 | 7.98 | [1] 9.65 | 0.6 | [1] 2.7 | Steel was pitted. |
| #8 | (b)<br>(c) | 0.25<br>0.50 | 18.2 | 8.68 | 8.29 | 4.3 | 3.8 | Do. |
| #9 | (b)<br>(d) | 0.25<br>0.10 | 21.7 | 8.49 | 5.08 | 1.2 | 0.0 | Steel was corroded. Low reserve alkalinity. |
| #10 | (c)<br>(d) | 0.50<br>0.10 | 17.2 | 9.12 | 8.38 | 4.4 | 2.8 | Steel was corroded. |
| #11 | (a)<br>(b)<br>(c) | 0.50<br>0.25<br>0.50 | 3.9 | 8.80 | 8.29 | 4.6 | 3.1 | Solder was etched. |
| #12 | (a)<br>(b)<br>(d) | 0.50<br>0.25<br>0.10 | 0.7 | 7.46 | 7.04 | 1.1 | 0.9 | Metals were good. Low reserve alkalinity. |
| #13 | (a)<br>(c)<br>(d) | 0.50<br>0.50<br>0.10 | 8.8 | 8.90 | 8.20 | 3.0 | 2.3 | Light pits on solder. |
| #14 | (b)<br>(c)<br>(d) | 0.25<br>0.50<br>0.10 | 5.1 | 9.06 | 8.98 | 4.7 | 3.7 | Light pits on steel. |
| #15 | (a)<br>(b)<br>(c)<br>(d) | 0.50<br>0.25<br>0.50<br>0.10 | 0.3 | 8.37 | 8.10 | 5.1 | 4.1 | Metal was excellent. |
| #16 | (a)<br>(b)<br>(c)<br>(d) | 0.20<br>0.25<br>0.50<br>0.05 | 0.6 | 8.92 | 8.48 | 4.9 | 1.9 | No apparent corrosion. |
| #17 | (a)<br>(b)<br>(c)<br>(d) | 0.70<br>0.10<br>0.60<br>0.10 | 0.4 | 9.02 | 8.41 | 5.9 | 3.1 | Do. |

[1] Increased pH and alkalinity due to formation of ferric hydroxide.

It will be noted from the data in Table I that the four agents constituting my invention when used alone gave very inferior results as compared with when they are all used together. It will also be noted that no other combination of these agents gave a satisfactory or comparable result.

Additional corrosion tests were carried out in the manner described in connection with Table I. In these tests the composition of the present invention was compared with three component inhibitors containing about the same total concentration. The amount of each metal removed by corrosion was determined as mgms. per square inch of test specimen. The results are shown in Table II.

TABLE II

*Corrosion test results in 20% by volume ethylene glycol solutions*

| Example | Inhibitor | Percent by Weight | Steel-Solder-Copper Couple | Copper-Solder-Copper Couple | Cast Iron | Copper | Aluminum | Comments |
|---|---|---|---|---|---|---|---|---|
| A | (a) Sodium nitrite<br>(b) Sodium 2-ethylhexyl-3-methylbutyl-orthophosphate<br>(c) Triethanolamine<br>(d) Sodium mercaptobenzothiazol | 0.50<br>0.25<br><br>0.50<br>0.10 | 0.3 | 0.1 | 0.1 | 0.4 | 0.2 | Note A. |
| B | (a)<br>(c)<br>(d) | 0.50<br>1.00<br>0.10 | 1.0 | 2.9 | 0.2 | 1.3 | 1.2 | Note B. |
| C | (a)<br>(b)<br>(d) | 0.50<br>0.50<br>0.10 | 0.9 | 0.9 | 2.1 | 1.1 | 0.5 | Note C. |
| D | (a)<br>(c)<br>(d) | 0.50<br>0.75<br>0.10 | 1.9 | 2.6 | 0.1 | 0.3 | 0.9 | Note D. |
| E | (a)<br>(b)<br>(d) | 0.50<br>0.75<br>0.10 | 0.6 | 1.8 | 0.4 | 0.4 | 0.0 | Note E. |

TABLE II—NOTES

| Note | Steel-Solder-Copper Couple | Copper-Solder-Copper Couple | Cast Iron | Copper | Aluminum |
|---|---|---|---|---|---|
| A | No apparent corrosion | No apparent corrosion | No apparent corrosion | No apparent corrosion | No apparent corrosion. |
| B | Solder very lightly pitted. | Solder pitted | do | do | Do. |
| C | No apparent corrosion | Copper slightly corroded. | Very light pitting | Very light corrosion | Do. |
| D | Slightly tarnished | Slightly tarnished | No apparent corrosion. | Very slightly tarnished. | Very slightly tarnished. |
| E | do | do | Slightly tarnished | Slightly tarnished | Slightly tarnished. |

From the data in Table II it will be apparent that the compositions representing the present invention gave superior results to the three component compositions containing the same, larger or somewhat smaller total amounts of inhibitors.

I have also carried out corrosion tests in which the composition of the present invention was compared under identical conditions with several commercial ethylene glycol antifreeze compositions which were purchased on the market during 1953–1954. These corrosion tests were made in accordance with the latest revision of proposed Laboratory Glassware Corrosion Tests as developed by Subcommittee VI of ASTM Committee D–15 on Engine Antifreeze. In this method one-inch by two-inch specimens of the metals listed below are uniformly cleaned, polished, weighed, and bolted together with a brass machine screw using four 1/32-inch thick brass washers in between each test specimen. The nuts are tightened to insure electrical contact.

Steel _____ 1/16", S. A. E. 1020 cold rolled.
Copper _____ 1/16", S. A. E. 71 cold rolled.
Brass _____ 1/16", S. A. E. 70–C, 1/2 hard.
Solder _____ 1/8", cast from 70–30 lead:tin solder.
Cast aluminum__ 1/8", S. A. E. 329.
Cast iron_____ 1/8", S. A. E. 120.

The specimen bundles are placed in 150 ml. of antifreeze solution contained in a 300 ml. tall-form beaker fitted with a neoprene stopper holding a condenser and a gas dispersion tube which extends to the bottom of the beaker. The solution is maintained at 160° F. and the aeration rate is set at 100 ml./minute. After 336 hours, the specimens are removed from the solution, examined visually, cleaned free of corrosion products, dried, and weighed. Corrosion losses are reported as mgms./specimen rather than mgms./square inch as used in the Table II tests. The results of these tests are shown in Table III.

TABLE III

*Corrosion test results for bolted metal specimens*

| Solution | Concentration, Percent by Volume | Copper | Solder | Brass | Steel | Cast Iron | Aluminum | Comments |
|---|---|---|---|---|---|---|---|---|
| Distilled water | 100 | 10.8 | 23.7 | 9.5 | 910.6 | 835.3 | 53.2 | Note 1. |
| Tap water | 100 | 2.4 | 31.8 | 2.4 | 1,396.0 | 833.3 | 22.2 | Note 2. |
| Ethylene glycol | 20 | 2.5 | 77.0 | 3.7 | 1,898.9 | 1,587.0 | 14.1 | Note 3. |
| Inhibited Ethylene glycol A* | 20 | 1.8 | 2.5 | 1.7 | 0.2 | +0.3 | 5.7 | Note 4. |
| Inhibited Ethylene glycol A* | 40 | 1.7 | 2.5 | 2.0 | 0.1 | +0.6 | 2.2 | Note 5. |
| Commercial antifreeze B | 20 | 11.3 | 2.5 | 7.2 | 3.1 | 3.5 | +4.3 | Note 6. |
| Commercial antifreeze C | 33 | 9.8 | +5.0 | 6.3 | 1.4 | 0.6 | 16.9 | Note 7. |
| Commercial antifreeze D | 20 | 3.2 | +2.9 | 3.9 | 0.6 | +0.9 | 6.5 | Note 8. |
| Commercial antifreeze E | 20 | 7.4 | 0.6 | 3.3 | 2.2 | 54.9 | 48.5 | Note 9. |
| Commercial antifreeze F | 20 | 13.7 | 20.5 | 8.5 | 11.0 | 45.0 | 22.9 | Note 10. |
| Army specification 4–1116 G | 20 | 6.6 | 11.1 | 6.6 | 23.1 | 86.9 | 31.2 | Note 11. |
| Army specification 4–1116 H | 33 | 12.5 | 22.3 | 4.9 | 6.4 | 2.9 | 29.1 | Note 12. |

*Containing 0.5% sodium nitrite, 0.5% sodium 2-ethylhexyl-3-methylbutylorthophosphate (50% dispersion in water), 0.5% triethanolamine, 0.2% sodium mercaptobenzothiazol (50% solution in water).

TABLE III—NOTES

| Note | Copper | Solder | Brass | Steel | Cast Iron | Aluminum |
|---|---|---|---|---|---|---|
| 1 | Light corrosion | Moderate pitting | Light corrosion | Heavy corrosion | Heavy corrosion | Moderate pitting. |
| 2 | Slight tarnish | Moderate corrosion. | Very light corrosion. | do | do | Moderate corrosion. |
| 3 | do | Heavy corrosion | Light corrosion | do | do | Do. |
| 4 | do | No apparent corrosion. | Slight tarnish | No apparent corrosion. | No apparent corrosion. | Light corrosion. |
| 5 | do | do | do | do | do | Do. |
| 6 | Light corrosion | do | Light corrosion | Very light corrosion. | Very light corrosion. | No apparent corrosion. |
| 7 | do | Very light pitting | Very light corrosion. | No apparent corrosion. | do | Light corrosion. |
| 8 | Slight tarnish | do | Slight corrosion | do | No apparent corrosion. | Light pitting. |
| 9 | Light corrosion | Very slight corrosion. | Light corrosion | Light pitting | Heavy pitting | Moderate corrosion. |
| 10 | do | Moderate corrosion. | do | Light corrosion | Heavy corrosion | Do. |
| 11 | do | Light corrosion | Very lt. corrosion. | Moderate corrosion. | do | Do. |
| 12 | do | Moderate corrosion. | do | Light corrosion | Light pitting | Do. |

The data in Table III show the instant invention is superior in every respect to products D, F, G and H. The invention was superior to product B in all respects at 40% concentration but was slightly inferior in aluminum loss at 20% concentration. However, this slight difference was greatly counterbalanced by the much greater loss of copper, brass, steel and iron exhibited by product B. The invention was superior to product C in all respects at 20% concentration but was slightly inferior at 40% concentration with regard to loss of cast iron. This was greatly offset by the copper, solder, brass, steel and aluminum loss shown by product C. The invention was poorer than product E in regard to solder loss. However, the invention was substantially better than product E in copper, brass and steel loss and vastly superior in cast iron and aluminum loss.

In addition to preventing the corrosion of metals in the cooling system of an engine, the compositions of the present invention have the important property not possessed by conventional compositions of preventing engine failure when a portion of the aqueous antifreeze composition leaks into the lubricating system. In order to illustrate the latter property of the composition of the invention and to compare this composition with antifreeze compositions containing borax, a single-cylinder Lauson Model LF822 Engine equipped with a special cylinder head and loaded by means of a 3 horsepower, 1700 R. P. M., 3 phase induction motor, was used. An auxiliary oil sump was installed between the engine sump and cylinder in order to operate the engine with a 0.35 pound oil charge. A small adjustable orifice was installed between the combustion chamber and the coolant passages in the cylinder head. During operation the orifice was adjusted to permit a constant flow of exhaust gases to pass through the antifreeze coolant.

With the coolant temperature maintained at 140° F. maximum, the engine was run at 1000 R. P. M. idle for 10 minutes, under load at ⅓ throttle opening for 30 minutes, and at 1000 R. P. M. idle for 10 minutes. A portion of the antifreeze coolant was then permitted to drip into the cylinder at the rate of three drops a minute for three hours while the piston was at bottom dead center after the compression stroke. The entire above operation was repeated 10 times, after which the engine was run for 10 minutes at 1000 R. P. M. idle and then for 60 minutes under load at full throttle. During the 60 minute run, the coolant temperature was held at 190° F. The above procedure constituted one cycle. If no indication of engine malfunction was noted, the cycle was repeated six times or until operational failure, which constitutes freezing of either the wrist pin or the piston.

The results of the Lauson engine test are given in Table IV. In the table, Antifreeze No. 1 and Antifreeze No. 2 are commercially marketed permanent type antifreeze compositions containing, respectively, about 1.5 and 2.0 percent of borax. They are the same as antifreeze agents F and E respectively, tested in Table III. Antifreeze No. 3 was a composition of the invention comprising about 95 percent ethylene glycol, 0.5 percent sodium nitrite, 0.25 percent sodium 2-ethylhexyl-3-methylbutylorthophosphate, 0.50 percent triethanolamine, and 0.10 percent sodium mercaptobenzothiazol. Fifty percent aqueous solutions of each antifreeze were used in each test.

TABLE IV

| Coolant | Lauson Engine Test Cycles |
|---|---|
| 50% Aqueous Solution of Antifreeze No. 1 | 2.2 |
| 50% Aqueous Solution of Antifreeze No. 2 | 1.8 |
| 50% Aqueous Solution of Antifreeze No. 3 | 6 |

Upon examination of the engines in which the aqueous solutions of Antifreeze No. 1 and Antifreeze No. 2 had been introduced, it was found that in each instance the wrist pins had frozen in both rod and piston. Also, there was a heavy deposit on the pistons and cylinder walls. There was no seizure in the engine with No. 3 Antifreeze. Examination of the engine in which the No. 3 Antifreeze had been introduced showed that the bearing surfaces were in excellent condition.

The antifreeze composition of the present invention was also used in twenty-one automobiles under normal driving conditions for seven consecutive winter months. The mileage driven during this test varied from 3019 to 13,379 miles. The antifreeze concentration varied from 28.2 to 46.5 percent by volume. Analysis of the antifreeze after these tests showed good maintenance of anti-corrosive power, small corrosion loss and small depletion of active components. The results of this test are given in Table V on the basis of average values found.

TABLE V

| | Before Test | After Test |
|---|---|---|
| pH (test solution) | 9.33 | 8.81 |
| Reserve Alkalinity* | 4.93 | 4.53 |
| Sodium nitrite, percent* | 0.500 | 0.363 |
| Sodium mercaptobenzothiazol, percent* | 0.100 | 0.011 |
| Phosphorus, percent* | 0.023 | 0.020 |
| Corrosion loss, Steel-Solder-Copper Couple, mgms./sq. in | 0.3 | 1.4 |

*Calculated to concentrated antifreeze.

I claim:

1. A permanent type antifreeze composition consisting essentially of a saturated dihydroxy aliphatic alcohol of low molecular weight containing approximately .2 to .8 percent by weight of an alkali metal nitrite, approximately .2 to 1.0 percent of triethanolamine, approximately .1 to .5 percent of an alkali metal 2-ethylhexyl-3-methylbutylorthophosphate and approximately .05 to .15 percent of an alkali metal mercaptobenzothiazol.

2. A permanent type antifreeze composition consisting essentially of a saturated dihydroxy aliphatic alcohol of low molecular weight containing approximately .5 percent by weight of an alkali metal nitrite, approximately .5 percent of triethanolamine, approximately .25 percent of an alkali metal 2-ethylhexyl-3-methylbutylorthophosphate and approximately .1 percent of an alkali metal mercaptobenzothiazol.

3. A permanent type antifreeze composition consisting essentially of ethylene glycol containing approximately .2 to .8 percent by weight of an alkali metal nitrite, approximately .2 to 1.0 percent of triethanolamine, approximately .1 to .5 percent of an alkali metal 2-ethylhexyl-3-methylbutylorthophosphate and approximately .05 to .15 percent of an alkali metal mercaptobenzothiazol.

4. A permanent type antifreeze composition consisting essentially of ethylene glycol containing approximately .5 percent by weight of an alkali metal nitrite, approximately .5 percent of triethanolamine, approximately .25 percent of an alkali metal 2-ethylhexyl-3-methylbutylorthophosphate and approximately .1 percent of an alkali metal mercaptobenzothiazol.

5. A permanent type antifreeze composition consisting essentially of ethylene glycol containing approximately .5 percent by weight of sodium nitrite, approximately .5 percent of triethanolamine, approximately .25 percent of sodium 2-ethylhexyl-3-methylbutylorthophosphate and approximately .1 percent sodium mercaptobenzothiazol.

References Cited in the file of this patent

UNITED STATES PATENTS

| Number | Name | Date |
| --- | --- | --- |
| 2,087,103 | Downing et al. | July 13, 1937 |
| 2,147,149 | Clapsadle et al. | Feb. 14, 1939 |
| 2,491,222 | Smith et al. | Dec. 13, 1949 |
| 2,692,860 | Barker | Oct. 26, 1954 |
| 2,751,355 | Clark | June 19, 1956 |

UNITED STATES PATENT OFFICE
Certificate of Correction

Patent No. 2,817,636 December 24, 1957

Robert C. Barker

It is hereby certified that error appears in the printed specification of the above numbered patent requiring correction and that the said Letters Patent should read as corrected below.

Column 4, line 3, for "5/8" x 1" 1/8"" read —5/8" x 1" x 1/8"—; column 8, line 26, for "0,25 percent" read —0.25 percent—.

Signed and sealed this 25th day of February 1958.

[SEAL]

Attest:
KARL H. AXLINE,
*Attesting Officer.*

ROBERT C. WATSON,
*Commissioner of Patents.*